(12) United States Patent
Starink et al.

(10) Patent No.: US 8,839,401 B2
(45) Date of Patent: Sep. 16, 2014

(54) MALICIOUS MESSAGE DETECTION AND PROCESSING

(75) Inventors: Angelo Starink, Morgan Hill, CA (US); David Knight, Belmont, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 13/491,494

(22) Filed: Jun. 7, 2012

(65) Prior Publication Data

US 2013/0333026 A1    Dec. 12, 2013

(51) Int. Cl.
*G06F 21/00*    (2013.01)
*G06F 21/70*    (2013.01)

(52) U.S. Cl.
USPC ............................................................ 726/11

(58) Field of Classification Search
USPC ............................................................ 726/11
See application file for complete search history.

(56) References Cited

U.S. PATENT DOCUMENTS

| | | | |
|---|---|---|---|
| 7,516,488 B1* | 4/2009 | Kienzle et al. ................... | 726/22 |
| 7,854,001 B1* | 12/2010 | Chen et al. ....................... | 726/22 |
| 2006/0021031 A1* | 1/2006 | Leahy et al. ..................... | 726/22 |
| 2006/0095955 A1* | 5/2006 | Vong ................................. | 726/3 |
| 2006/0101120 A1* | 5/2006 | Helsper et al. ................ | 709/206 |
| 2006/0101334 A1* | 5/2006 | Liao et al. ..................... | 715/523 |
| 2006/0251068 A1* | 11/2006 | Judge et al. ................... | 370/389 |
| 2007/0136806 A1* | 6/2007 | Berman ........................... | 726/22 |
| 2009/0328216 A1* | 12/2009 | Rafalovich et al. ............. | 726/23 |
| 2010/0082979 A1* | 4/2010 | Edwards ........................ | 713/168 |
| 2010/0154059 A1* | 6/2010 | McNamee et al. ............... | 726/23 |
| 2010/0318642 A1* | 12/2010 | Dozier ........................... | 709/223 |
| 2012/0030302 A1 | 2/2012 | Lund et al. | |
| 2012/0079596 A1 | 3/2012 | Thomas et al. | |
| 2012/0102545 A1 | 4/2012 | Carter, III et al. | |
| 2012/0151585 A1* | 6/2012 | Lamastra et al. ............... | 726/24 |

FOREIGN PATENT DOCUMENTS

EP    2326057    5/2011
WO    WO2013184529    12/2013

OTHER PUBLICATIONS

International Search Report and Written Opinion mailed Jan. 3, 2014 in Patent Cooperation Treaty Application No. PCT/US2013/043790, filed May 31, 2013.

* cited by examiner

*Primary Examiner* — William Powers
(74) *Attorney, Agent, or Firm* — Carr & Ferrell LLP

(57) ABSTRACT

Malicious message detection and processing systems and methods are provided herein. According to some embodiments, the messages are emails and the method for processing emails may be facilitated by way of an intermediary node which may be cloud-based. The intermediary node may be communicatively couplable with an email client and an email server. The intermediary node may execute a method that includes analyzing a link included in an email to determine if the link is associated with a potentially malicious resource, and replacing the link with an alternate link to a trusted resource if the link is associated with a potentially malicious resource.

19 Claims, 13 Drawing Sheets

MALICIOUS MESSAGE DETECTION AND PROCESSING

FIELD OF THE PRESENT TECHNOLOGY

The present technology relates generally to detecting and processing malicious messages, and more specifically, but not by way of limitation, to systems and methods for detecting and processing malicious and potentially malicious email messages, which protect email message recipients from exposure to spam, phishing, bulk, adult, and other similar types of deleterious and undesirable email messages and exposure to malicious and potentially malicious resources included in such emails.

BACKGROUND

Malicious electronic messages may include, for example, spam, phishing, bulk, adult, and other similar content, which are designed to generate revenue. The messages may be in the form of email, instant messages, and the like. Although the description herein includes examples and other description of messages in the email context, the present invention is not limited to email messages. In addition, some types of malicious emails are designed to steal sensitive information such as bank account information, credit card account information, usernames and passwords, and social security numbers—just to name a few. Some malicious emails such as phishing emails will appear to be generated by a legitimate source, such as a merchant with which the end user conducts business. These emails may include logos, trademarks, and/or other source indicators that are used to make the email appear to be legitimate. These types of emails are often referred to as spoofed email or cloned emails. Some types of spoofed/cloned emails may be specifically targeted to certain individuals and are often referred to as spear phishing attacks.

With regard to spoofed emails, these malicious emails will also include a hyperlink that appears to be associated with a legitimate website operated by the merchant. Unfortunately, these hyperlinks are linked to malicious resources that are designed to steal sensitive information from end users. For example, the malicious resource may include a fake login page that spoofs the login page of an online banking interface. When the end user enters their logon information, the logon information is exposed and captured.

SUMMARY

According to some embodiments, the present technology may be directed to methods for processing messages using an intermediary node. The methods may comprise: (a) analyzing, via the intermediary node, a link included in a message to determine if the link is associated with a potentially malicious resource; and (b) replacing the link with an alternate link to a trusted resource if the link is associated with a potentially malicious resource.

According to other embodiments, the present technology may be directed to an intermediary node for processing messages. The intermediary node may comprise: (a) a memory for storing executable instructions; and (b) a processor for executing the executable instructions, the executable instructions comprising: (i) an analysis module that analyzes a link included in an email to determine if the link is associated with a potentially malicious resource; and (ii) a modifier module that replaces the link with an alternate link to a trusted resource if the link is associated with a potentially malicious resource.

According to additional embodiments, the present technology may be directed to methods for processing messages using an intermediary node. The method may comprise: (a) locating, via the intermediary node, at least one uniform resource locator included in a message; (b) analyzing, via the intermediary node, the at least one uniform resource locator to determine if the at least one uniform resource locator is associated with a potentially malicious resource; and (c) replacing the at least one uniform resource locator with an alternate link to a trusted resource if the at least one uniform resource locator is associated with a potentially malicious resource.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
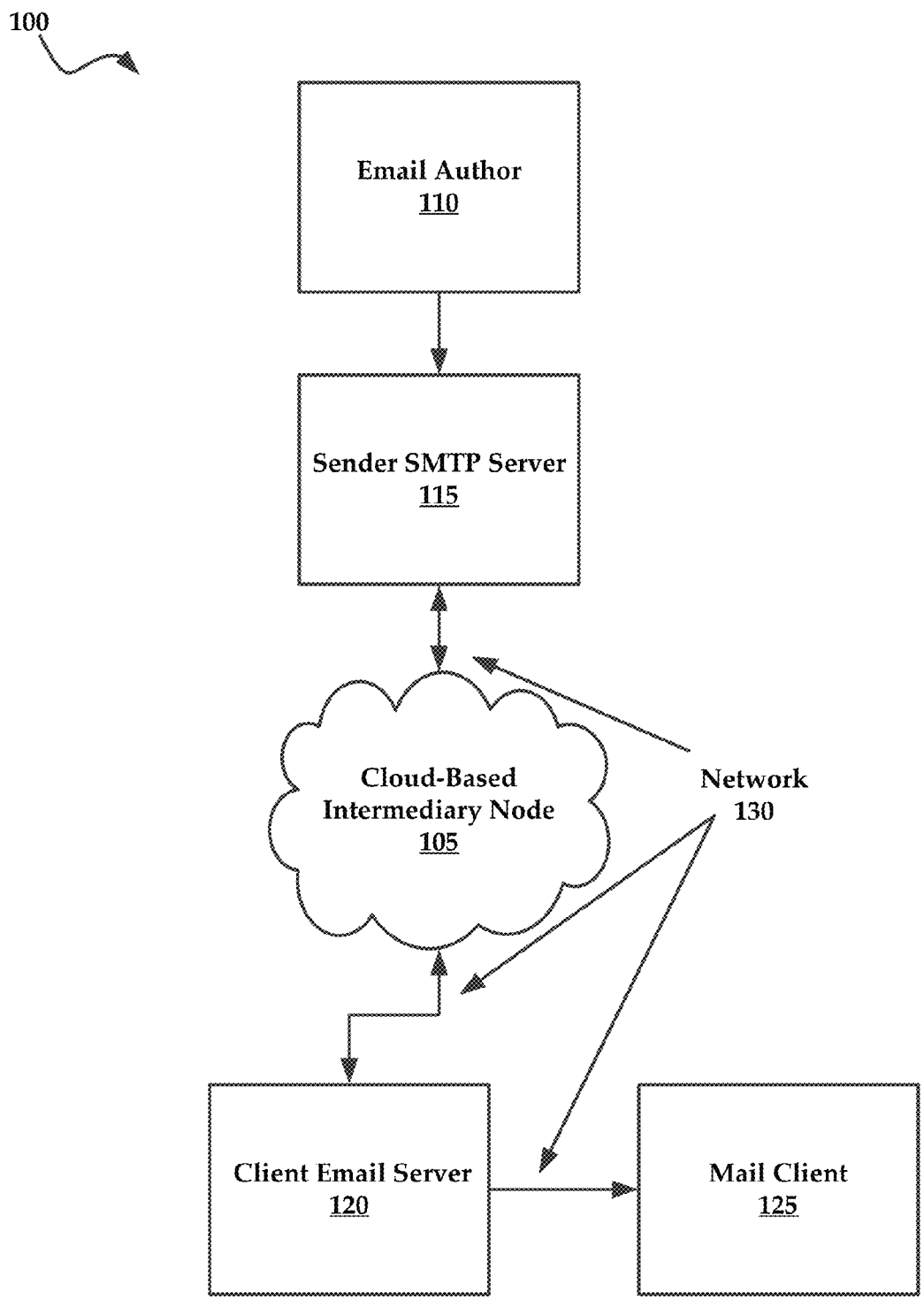
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed to malicious message detection and processing. The messages may be in the form of email, instant messages, and the like. Although the description herein includes examples and other description of messages in the email context, the present invention is not limited to email messages. More specifically, but not by way of limitation, the present technology may employ a cloud-based intermediary node that is configured to detect potentially malicious emails and confirm whether the email comprises malicious content. As background, a malicious email may include spam, adult, phishing, bulk, and/or other similar types of content. These emails serve to generate revenue for their respective authors, but are often an annoyance to the recipient, and may often be sent with nefarious intent. As mentioned above, some malicious emails may include links that are designed to deceive the recipient into disclosing sensitive information such as social security numbers, credit card numbers, and so forth.

The present technology may detect whether an email communication is likely malicious. Additionally, if the email is likely to be malicious, the present technology may parse the email to determine if there are links included in the email that are associated with malicious resources. A malicious resource may include a spoofed website that is designed to induce the recipient into exposing their sensitive information, although other common malicious resources that would be known to one of ordinary skill in the art may likewise be detected by the present technology.

Once the present technology has determined that an email includes a link to a potentially malicious resource, the present technology may exchange the link with an alternate link to a safe resource, such as a block webpage. The present technology may also modify the email to include a visual representation of the actual domain name of the potentially malicious resource so that the recipient may see the true identity of the link. This feature may be advantageous in instances where the viewable text of the hyperlink is ambiguous and/or misleading. In some instances, access to the potentially malicious resource may be prohibited by deactivating or breaking the hyperlink such that the recipient cannot request or receive the resource by clicking on the hyperlink text. Hyperlinks embedded within images or other resources may also be processed in a similar manner. The present technology may also determine that the link in an email is safe, i.e., certainly not malicious. For example, a link may be known to be safe since it is on a safelist or otherwise known to be safe.

The present technology may also score email messages to determine a likelihood that the email is malicious, as well as quarantining malicious emails, and generating blocklists of malicious resources, and safelists. These and other advantages of the present technology will be described in greater detail below with reference to the collective drawings (e.g., FIGS. 1-12).

FIG. 1 illustrates an exemplary architecture 100 for practicing aspects of the present technology. According to some embodiments, the exemplary architecture 100, hereinafter "architecture 100," may generally include a cloud-based intermediary node, hereinafter "intermediary node 105." Generally speaking, the intermediary node 105 may be configured to process emails by analyzing a link included in an email to determine if the link is associated with a potentially malicious resource and replacing the link with an alternate link to a trusted resource if the link is associated with a potentially malicious resource. In various embodiments, if the link is identified as being certainly malicious, the email is filtered and not delivered to the email server.

In various embodiments, the intermediary node 105 may be configured to locate at least one uniform resource locator included in an email, analyzing the at least one uniform resource locator to determine if the at least one uniform resource locator is associated with a potentially malicious resource, and replace the at least one uniform resource locator with an alternate link to a trusted resource if the at least one uniform resource locator is associated with a potentially malicious resource.

According to some embodiments, the intermediary node 105 may be implemented within a cloud-based computing environment, i.e., cloud-based intermediary node 105. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

Email authors 110 may compose emails that are delivered to a recipient by a sender server 115, which may include a server that implements simple mail transfer protocol ("SMTP"). Email authors 110 may compose both legitimate and/or malicious emails using an email program, which may include, for example, Outlook™, Entourage™, and so forth. The email author 110 may also compose and send emails using a web-based email interface. In a traditional configuration, the sender SMTP server 115 may deliver email messages directly to a client email server 120, which would deliver the email to a mail client 125, such as an email program or web-based email interface. The client email server 120 may comprise, for example, an enterprise email server such as Exchanger™, Domino™, and so forth.

In accordance with the present technology the intermediary node 105 may be positioned between the sender SMTP server 115 and the client email server 120. Thus, the intermediary node 105 may filter and/or process potentially/actually malicious emails before the emails are delivered to the client email server 120.

The components included in the architecture 100 may be communicatively coupled via a network 130. It is noteworthy to mention that the network 130 may include any one (or combination) of private or public communications networks such as the Internet.

Figure 2:
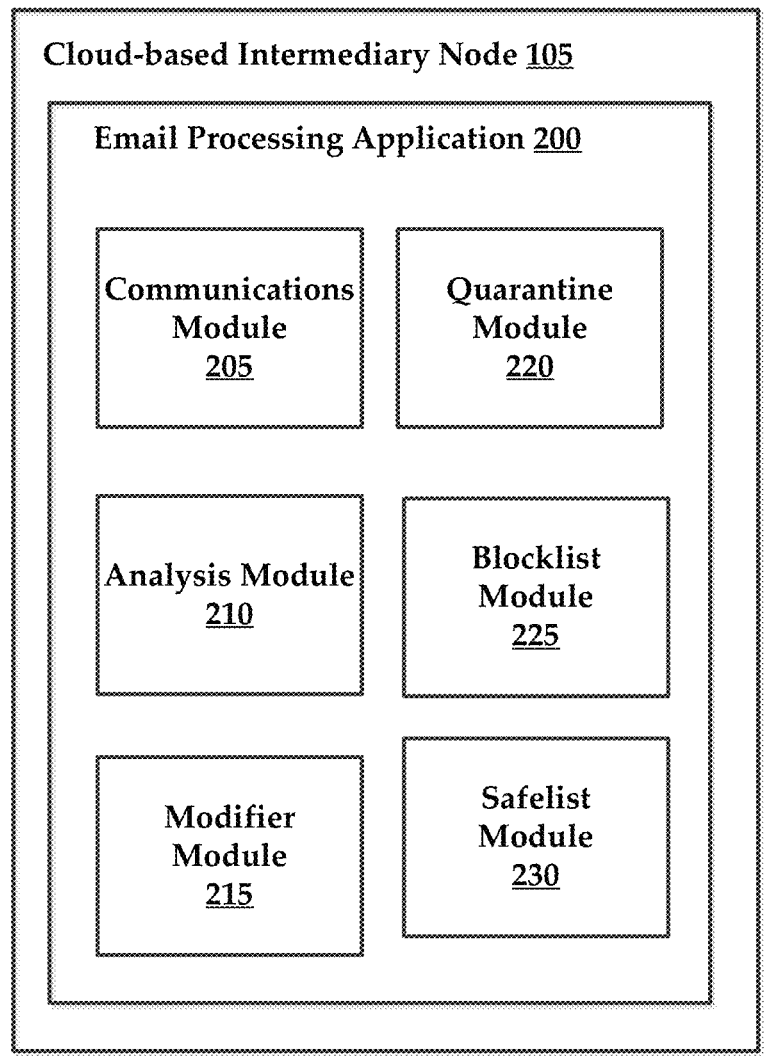
FIG. 2 is a block diagram of an exemplary email processing application for use in accordance with the present technology.

Referring now to FIG. 2, the Cloud-based intermediary node 105 may include executable instructions that are stored in memory. These instructions may be executed by a processor of the intermediary node 105. An exemplary computing system that includes memory and a processor is described in greater detail with reference to FIG. 12. FIG. 2 includes a block diagram of an email processing application 200. According to some embodiments, when executed, the email processing application 200 may cause the intermediary node 105 to perform various methods for processing emails, which will be described in greater detail below.

According to some embodiments, the email processing application 200 may comprise a communications module 205, an analysis module 210, a modifier module 215, a quarantine module 220, and a blocklist module 225, and safelist module 230. It is noteworthy that the email processing application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the email processing application 200 may include separately configured web servers.

Figure 3:
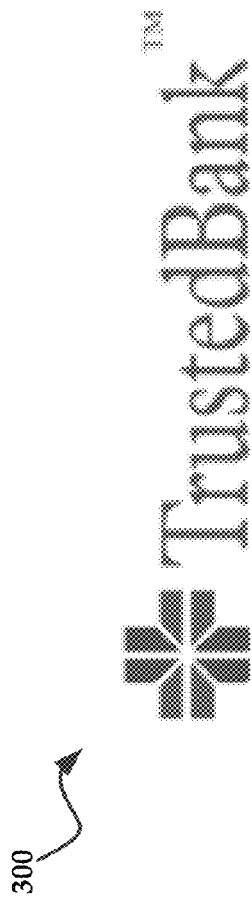
FIG. 3 is an exemplary malicious email in the form of a spoofed email.

Generally speaking, the communications module 205 may receive email messages, both malicious and non-malicious, from various sender SMTP server systems, as shown in FIG. 1. FIG. 3 illustrates an exemplary malicious email 300 that spoofs the layout and content of an exemplary email sent by a trusted organization, such as a bank. This email 300 includes an exemplary link 305, such as a hyperlink. While the link appears to be associated with the domain name of the trusted organization, an examination of the source code of the email reveals that the link 305 is actually associated with a potentially malicious resource. For example, the source code for the link 305 may specify "<A HREF="http://www.spammer.domain">http://www.yourtrustedbank.com/general/custverifyinfo.asp</A>," where http://www.spammer.domain includes a potentially malicious resource.

Once an email is received, the analysis module 210 may be executed to evaluate the email and determine if a link included in the email is associated with a potentially malicious resource. It will be understood that the emails may be pre-processed by a general purpose spam filter to remove emails that are easily identifiable as being certainly, not just potentially, malicious, just by a review of content included in the email. For example, an email that includes textual content that references adult material may be automatically classified as spam and deleted or quarantined.

In addition, the pre-processing of emails may include the generation of a trust/reputation/spam score for the email.

Figure 4:
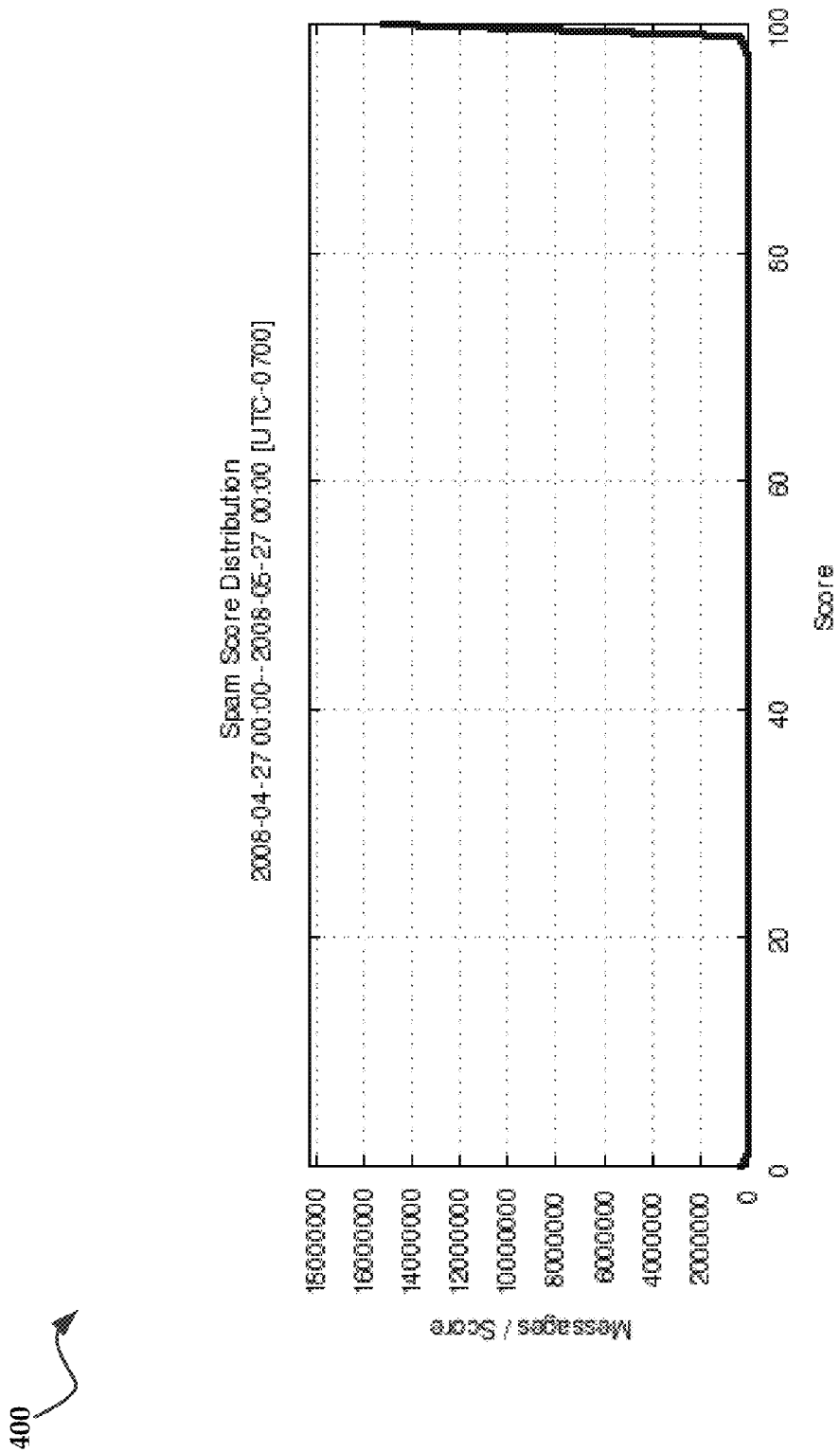
FIG. 4 is a graph of an exemplary distribution of spam scores generated for a plurality of email messages.

FIG. 4 illustrates a chart 400 which comprises an exemplary distribution of spam scores for a plurality of emails. As is shown, the vast majority of emails are, in fact, malicious. What is also apparent is that not all emails receive a score of zero (which indicates that the email is definitely not malicious), or one hundred (which indicates that the email is almost certain to be malicious). The present technology may aid in the processing of emails that receive a score somewhere between zero and one hundred (i.e., potentially malicious emails), although in some instances it may be advantageous to process all emails using the present technology. For example, email administrator may desire to identify and categorize as many malicious resources as possible to create a robust blocklist and a safelist, as will be described in greater detail below. In some embodiments, delivery of an email is temporarily delayed by the intermediary node 105, e.g., thirty minutes, in order to determine the disposition of an email message based on new information which might have been received during the delay period. After the delay period, the score of the message might be different and therefore, the associated action taken for the email may also be different.

Figure 5:
FIG. 5 is a table of exemplary spam rules that are utilized to categorize emails.

FIG. 5 illustrates an exemplary table 500 that comprises various attributes of spam rules that are applied to emails by the pre-processing system mentioned above. As is shown, emails may be classified as definite spam (emails with a spam score of 100), phishing, adult, spam, bulk, suspect, and notspam. Again, the present technology may assist in further processing emails that have been categorized as "suspect", i.e., potentially malicious.

Once emails have been received by the communications module 205, the analysis module 210 may be executed to evaluate links associated with the emails. Again, a link may comprise any of a uniform resource locator ("URL"), a uniform resource indicator ("URI"), an Internet protocol address ("IP"), a domain name, or combinations thereof. The link may comprise any hyperlink that is associated with online resource. These resources may be linked to any of text, an image, a video, an icon, or any other object that can be included in an email message that would be known to one of ordinary skill in the art with the present disclosure before them. For example, a hyperlink often includes a text string (e.g., "Click Here") that instructs or entices the recipient into clicking on the hyperlink.

The analysis module 210 may conduct an initial evaluation of any of the links associated with an email. The analysis module 210 may employ any one (or combination) of a number of techniques for preliminarily evaluating a link. For example, the analysis module 210 may evaluate an age of a domain name associated with an online resource. The analysis module 210 may automatically classify links associated with domains that were registered within a specific time period as potentially malicious. By way of non-limiting example, links to domains that were registered within the last three days may be classified as potentially malicious.

Once a link has been found to be associated with a potentially malicious resource, the modifier module 215 may be executed to replace the link associated with potentially malicious resource with an alternate link. In some instances, the link may be replaced with an alternate link that is associated with a trusted resource such as a landing page. In some instances, the landing page may comprise a block webpage (see FIG. 7). In various embodiments, the alternate link may include a redirection script that directs the recipient to a well known search page or other resource.

For example, the modifier module 215 may modify the source code of the email to replace the link associated with the potentially malicious resource. In some instances, the modifier module 215 may display an indicator associated with the potentially malicious resource proximate the link. Thus, the domain name associated with the potentially malicious resource may be exposed to the email recipient. In some instances, the modifier module 215 may deactivate the link. That is, the modifier module 215 may modify the link in the email to prevent the email recipient from opening the potentially malicious resource. Thus, if the email recipient clicks on the link, no action is performed (i.e., the potentially malicious resource is not returned).

In some embodiments, emails may be quarantined by the quarantine module 220 when the email has been categorized as potentially malicious or alternatively after the link associated with email has been verified as malicious.

According to some embodiments, emails that have been categorized as potentially malicious and quarantined may be re-evaluated by the analysis module 210 while quarantined. For example, if an email includes a link that is associated with a domain that has only recently been registered, subsequent evaluation of the link after a given period of time may reveal that the domain name is associated with a legitimate resource. Thus, while the link was initially categorized as potentially malicious, the link was actually non-malicious. The email may be redelivered to the client email server 120 and finally to the mail client 125.

In other embodiments, the email may not be quarantined, but the link may be provisionally deactivated. When subsequent analysis reveals that the link is associated with a legitimate resource, the link in the email may be reactivated and the email pushed/delivered to the mail client 125. The analysis module 210 may include comparing information regarding the potentially malicious resource to safelists, which may be private or publically available safelists. These safelists may comprise IP addresses, domain names, MAC addresses, or other computing system indicators that may be used to identify an online resource.

The analysis module 210 may also verify that a potentially malicious resource is, in fact, malicious. The analysis module 210 may include comparing information regarding the malicious resource to blocklists, which may be private or publically available blocklists. These blocklists may comprise IP addresses, domain names, MAC addresses, or other computing system indicators that may be used to identify an online resource. In various embodiments, the analysis module 210 may also conduct a deep-content inspection of the potentially malicious resource by loading the potentially malicious resource in a sandbox (e.g., testing) environment on the intermediary node 105.

Other methods for verifying the malicious nature of an online resource that would be known to one of ordinary skill in the art are also likewise contemplated for use in accordance with the present technology.

According to some embodiments, once a link has been confirmed to be associated with a malicious resource, the blocklist module 225 may be executed to store identifying information for that resource in a blacklist for future reference. Conversely, according to some embodiments, once a link has been confirmed to be associated with a safe resource that is certainly not malicious, the safelist module 230 may be executed to store identifying information for that resource in a safelist for future reference.

Figure 6:
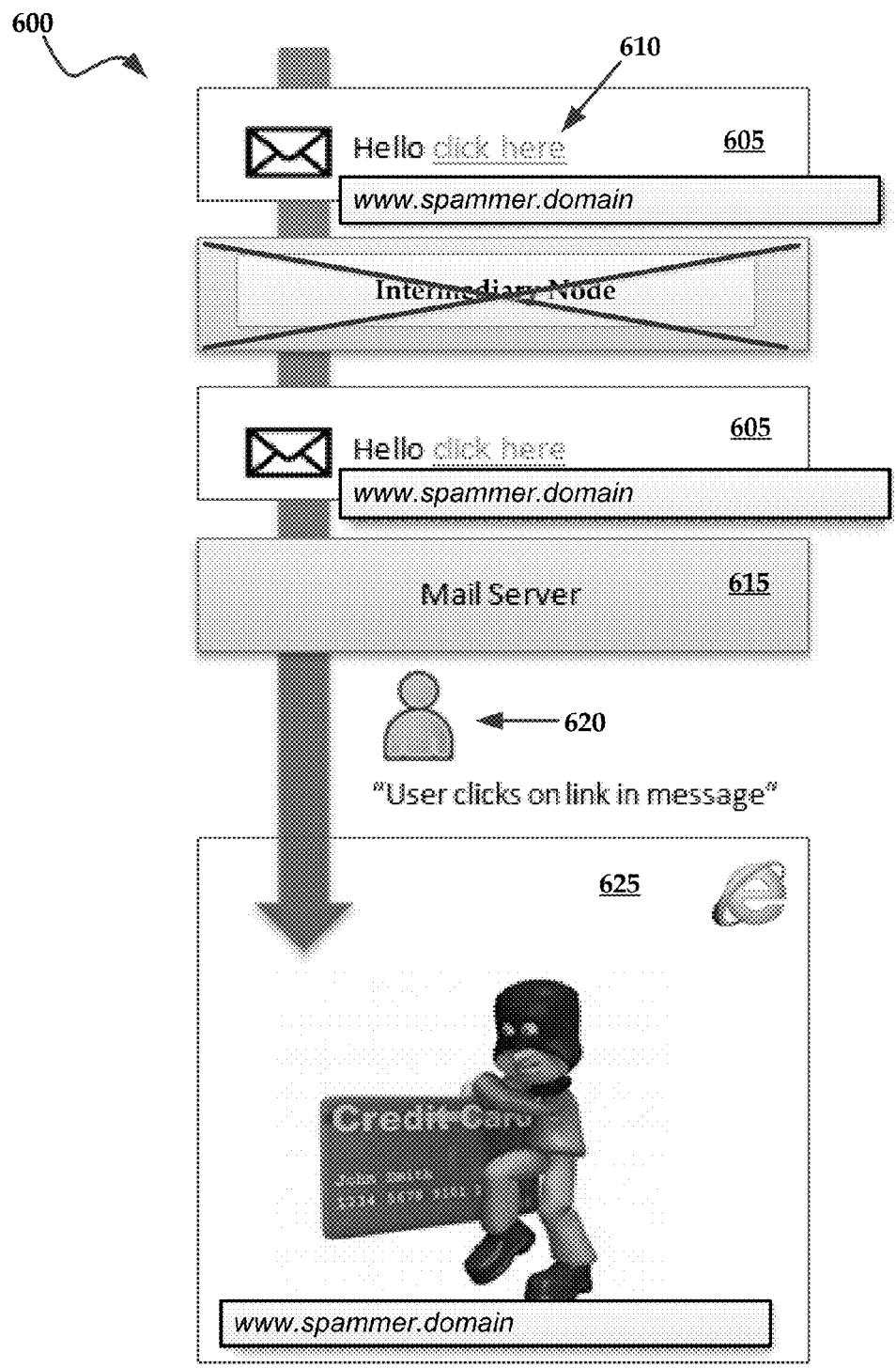
FIG. 6 is an exemplary flow diagram of a typical phishing attack.

FIG. 6 is a diagrammatical representation of a phishing attack 600 where a potentially malicious email is not intercepted or quarantined. Generally, a potentially malicious email 605 is received. The potentially malicious email 605 may comprise a link 610 to a potentially malicious resource. Because the potentially malicious email 605 is not processed by an intermediary node of the present technology, the email is received by the mail server 615 and passed through to a mail client 620. When the email recipient clicks on the link 610, a potentially malicious resource 625 is returned to the recipient. In this instance, the potentially malicious resource 625 may include a webpage that is designed to steal sensitive information from the recipient.

Figure 7:
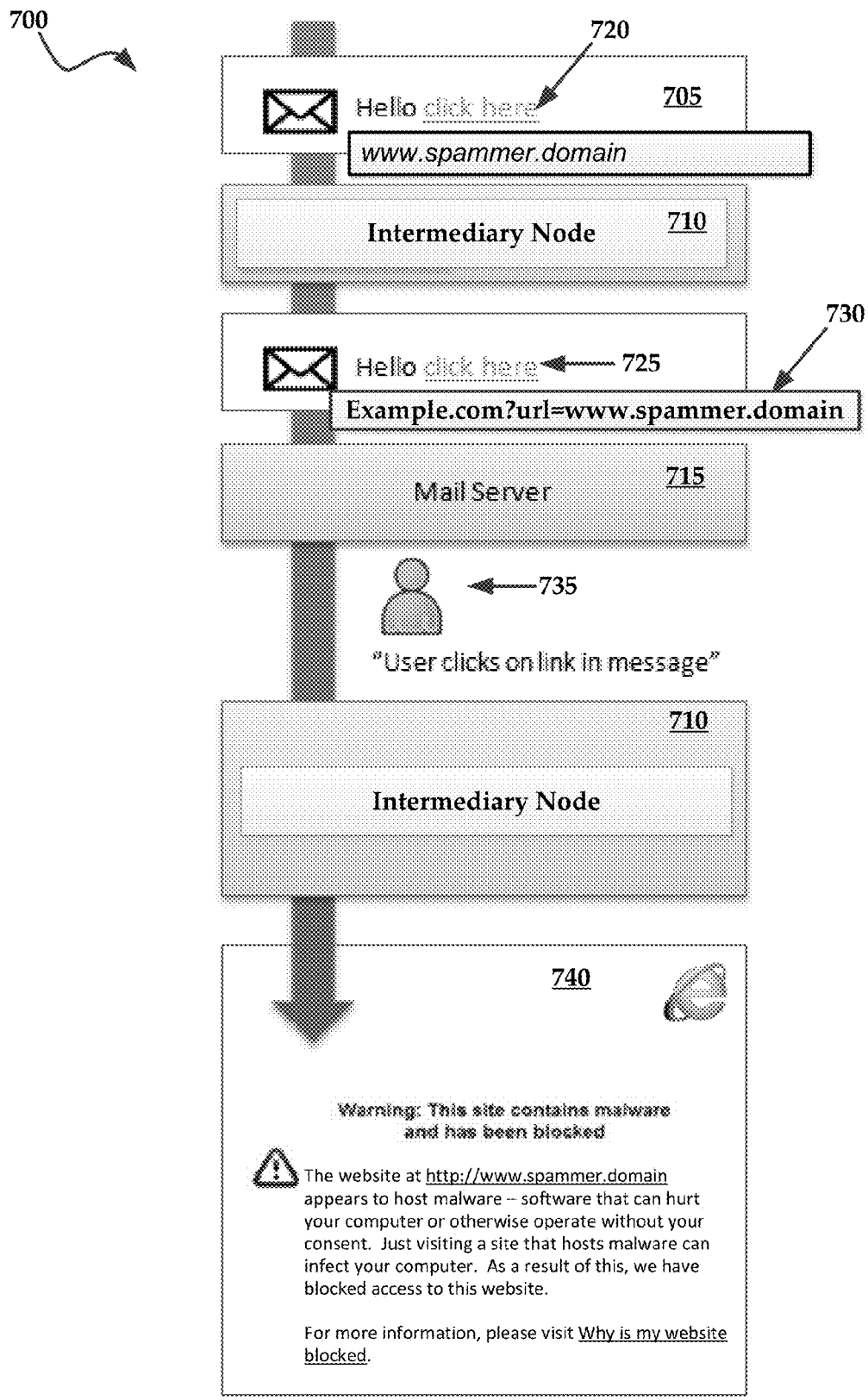
FIG. 7 is a diagrammatical representation of a phishing attack where a malicious email is detected and processed by the present technology.

FIG. 7 is a diagrammatical representation of a phishing attack 700 where a potentially malicious email is intercepted by the present technology. Generally, a potentially malicious email 705 is received by an intermediary node 710 prior to delivery to the mail server 715. The potentially malicious email 705 may comprise a link 720 to a potentially malicious resource. The intermediary node 710 may replace the link 720 with an alternate link 725. Additionally, the intermediary node 710 may modify the email to include an indicator 730 that includes at least a portion of the domain associated with the potentially malicious resource (e.g., url=www.spammer.domain). In some instances, the indicator 730 may be displayed in parentheses, or in any other manner that causes the domain of the potentially malicious resource to be set apart or distinctive, and thus more visually distinct to the email recipient. The indicator may be configured for other indications depending on the various applications and user needs.

Figure 8A:
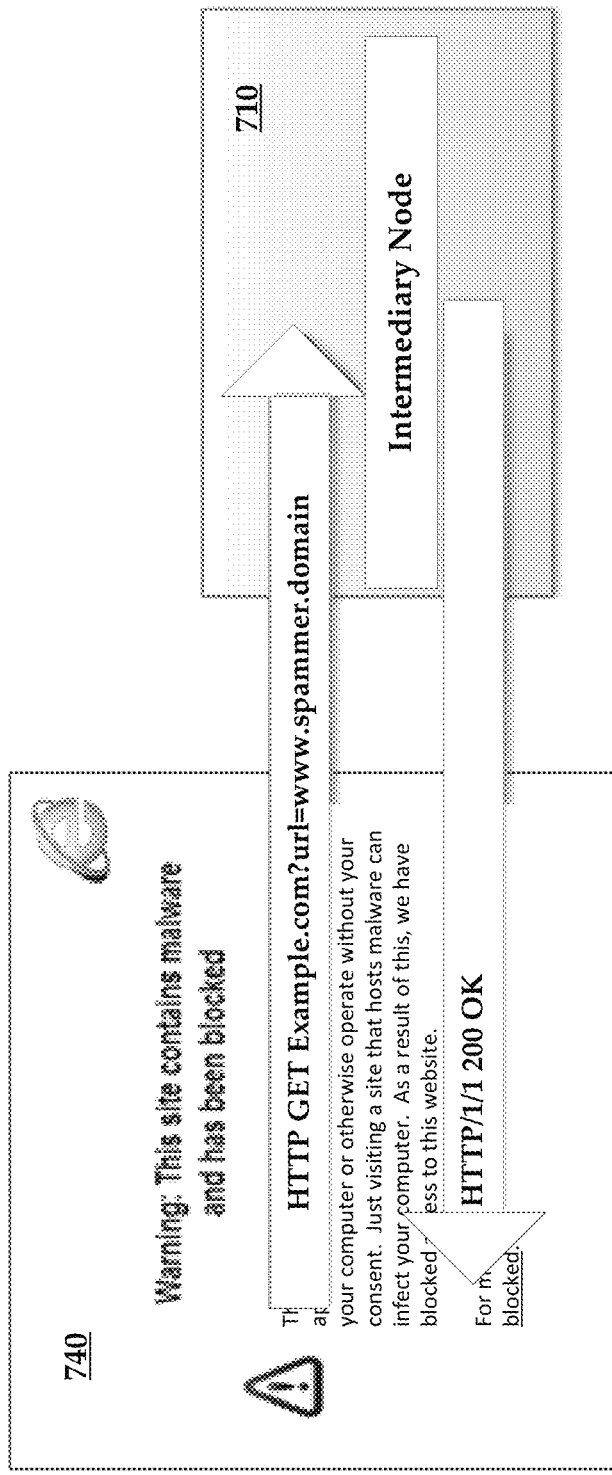
FIG. 8a is a diagrammatical representation of the provision of a landing page.
Figure 8B:
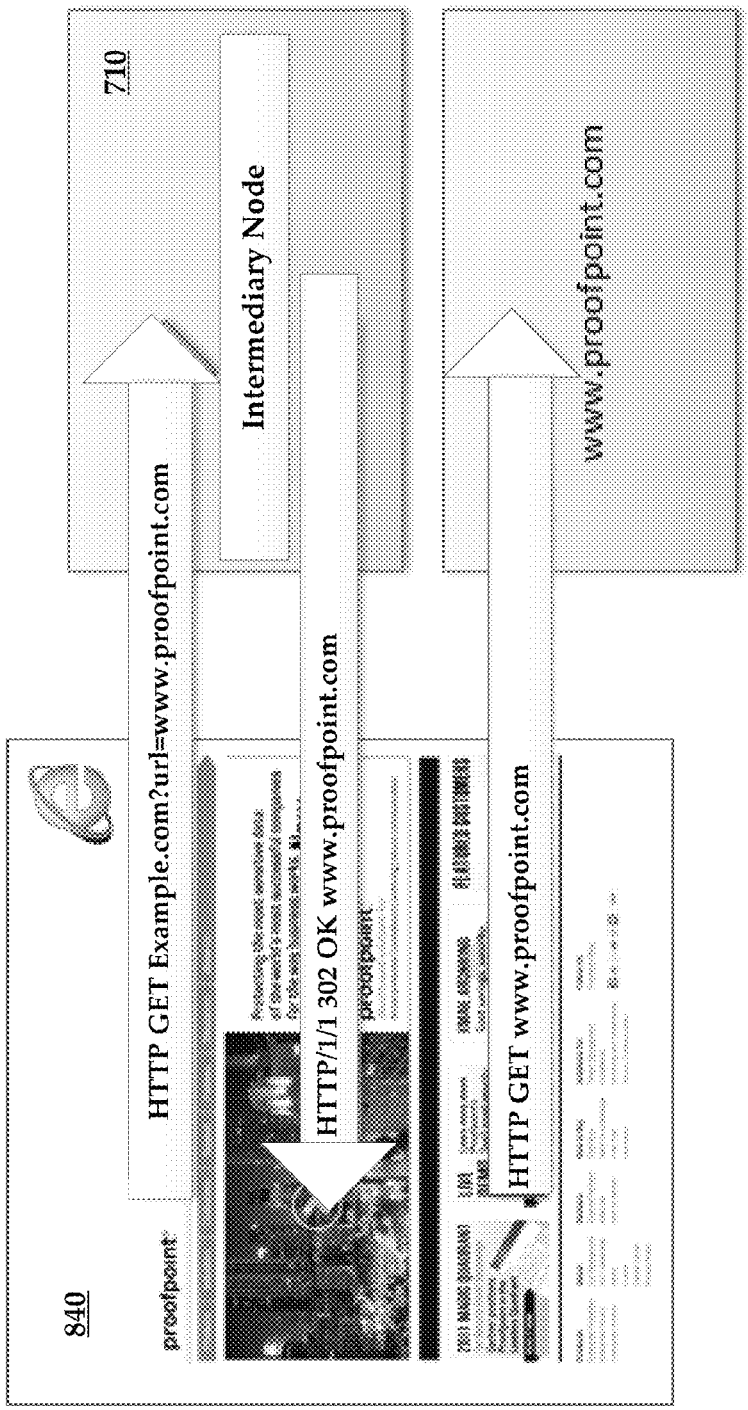
FIG. 8b is a diagrammatical representation of the provision of redirecting to an original link that is determined to be a valid, i.e., not potentially malicious, link.

When the email recipient 735 clicks on the alternate link 725, the intermediary node 710 provides the email recipient with a landing page 740, which in this embodiment comprises a block page that notifies the email recipient that the original link was associated with a potentially malicious resource. FIG. 8a illustrates the intermediary node 710 requesting a potentially malicious resource and returning a landing page 740. FIG. 8b illustrates an exemplary embodiment wherein the intermediary node 710 returns a HTTP 302 redirect to the original link that was determined by the intermediary node 710 to be a valid, i.e., not potentially malicious, link. As shown in this example, it is totally transparent to the end user that clicking the link resulted in contacting the intermediary node 710 first before opening the actual webpage 840 at the link.

Figure 9:
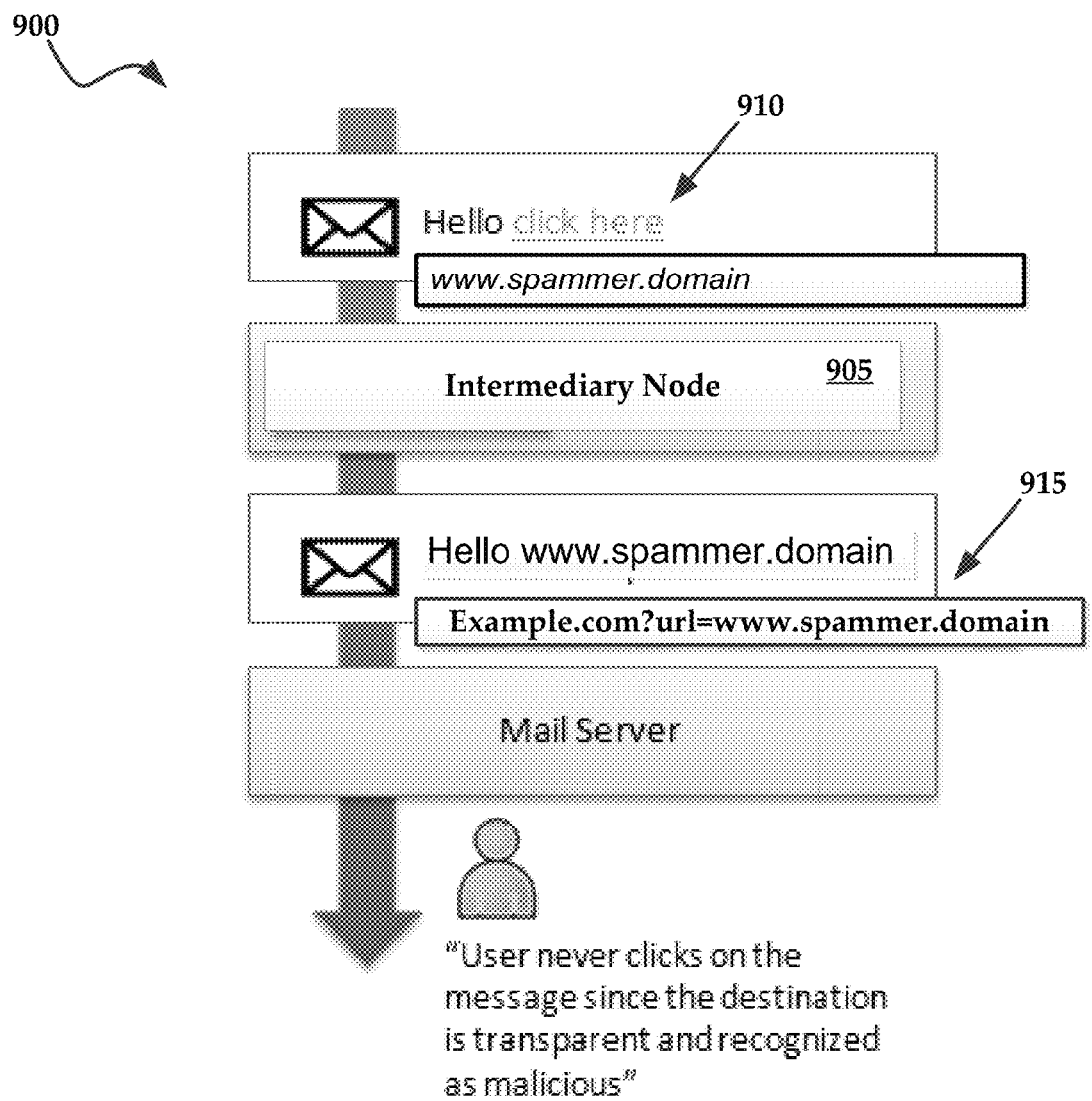
FIG. 9 is another diagrammatical representation of a phishing attack where a malicious email is detected and processed by the present technology.

FIG. 9 is a diagrammatical representation of a phishing attack 900 where a potentially malicious email is intercepted by the present technology. In this instance an intermediary node 905 may rewrite a link 910 associated with a potentially malicious resource in order to show transparency, e.g., the actual link ("www.spammer.domain"); so the end user can make a better and more informed decision whether to click on this link or not. In some embodiments, the intermediary node 905 may also display an indicator 915 for the link 910.

Figure 10:
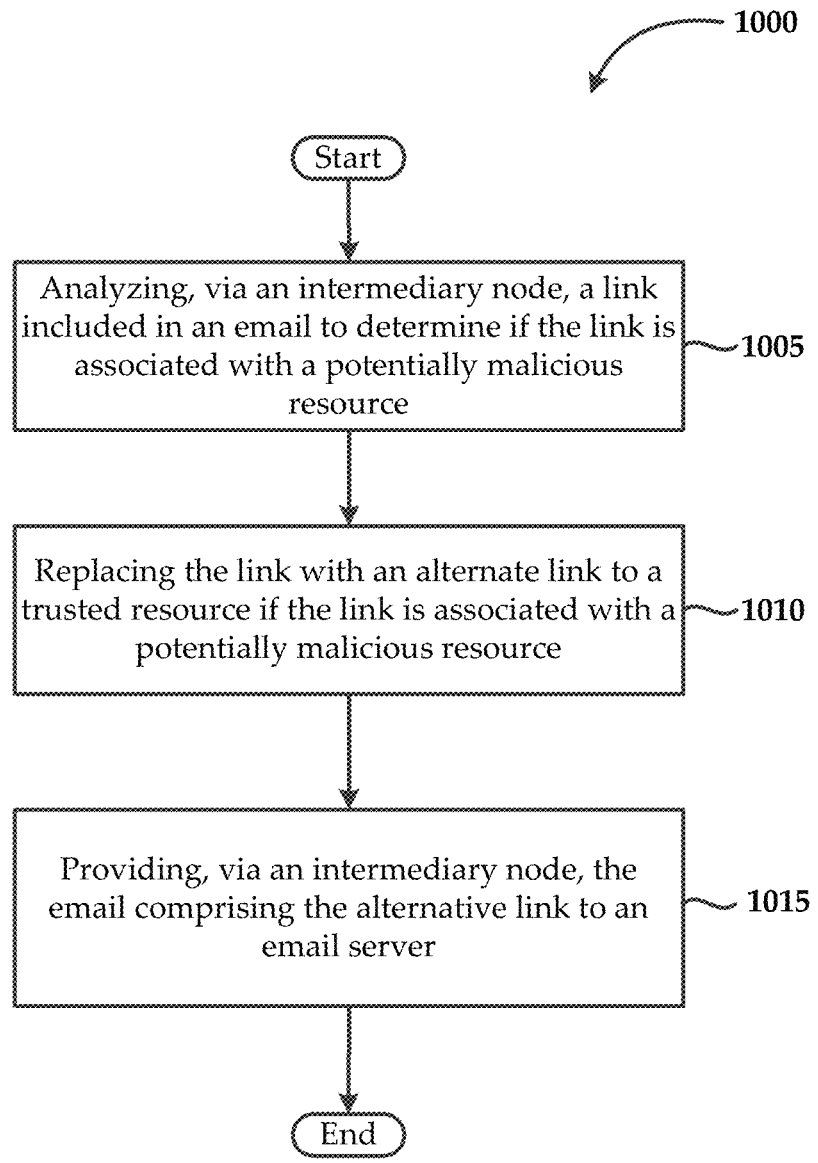
FIG. 10 is a flowchart of an exemplary method for processing emails in accordance with the present disclosure.

FIG. 10 is a flowchart of an exemplary method for processing emails. The method 1000 may comprise a step 1005 of analyzing, via the intermediary node, a link included in an email to determine if the link is associated with a potentially malicious resource. The method may also comprise a step 1010 of replacing the link with an alternate link to a trusted resource if the link is associated with a potentially malicious resource, as well as a step 1015 of providing, via an intermediary node, the email comprising the alternative link to an email server.

Figure 11:
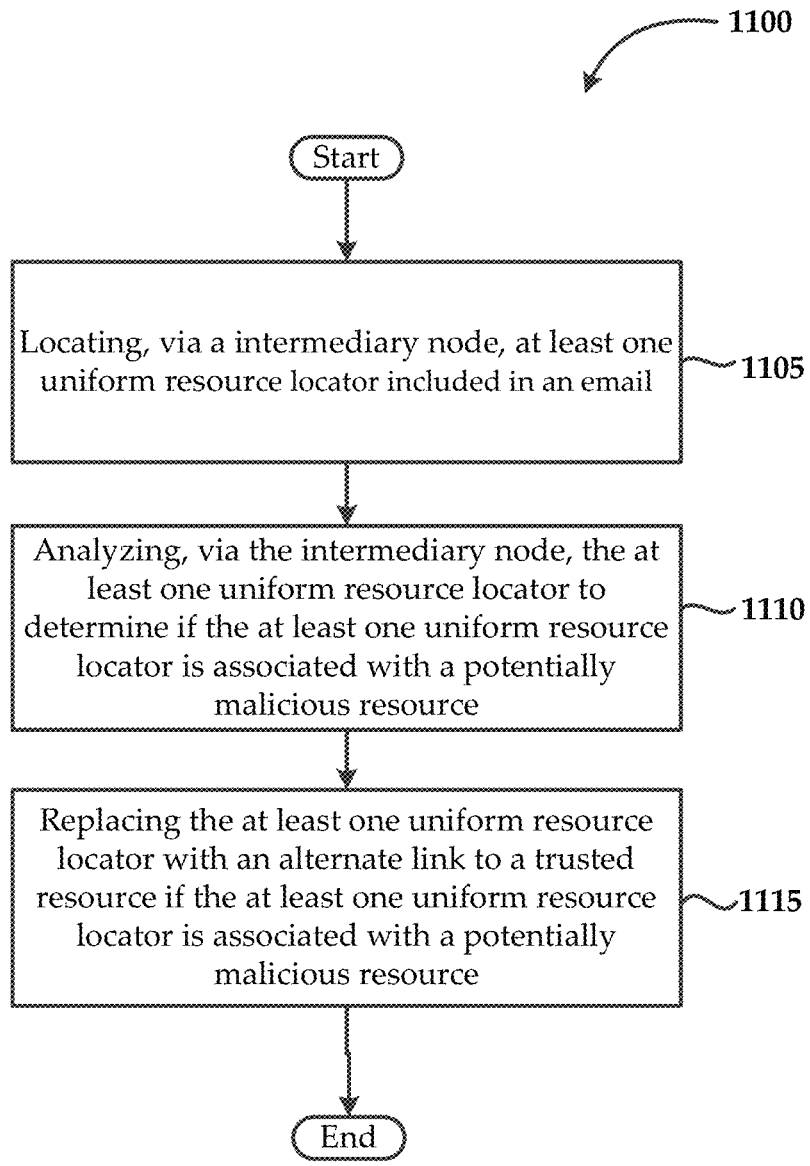
FIG. 11 is a flowchart of another exemplary method for processing emails in accordance with the present disclosure.

FIG. 11 is a flowchart of another exemplary method for processing emails. The method 1100 may comprise a step 1105 of locating, via the intermediary node, at least one uniform resource locator included in an email. The method may also comprise a step 1110 of analyzing, via the intermediary node, the at least one uniform resource locator to determine if the at least one uniform resource locator is associated with a potentially malicious resource, as well as a step 1115 of replacing the at least one uniform resource locator with an alternate link to a trusted resource if the at least one uniform resource locator is associated with a potentially malicious resource.

Figure 12:
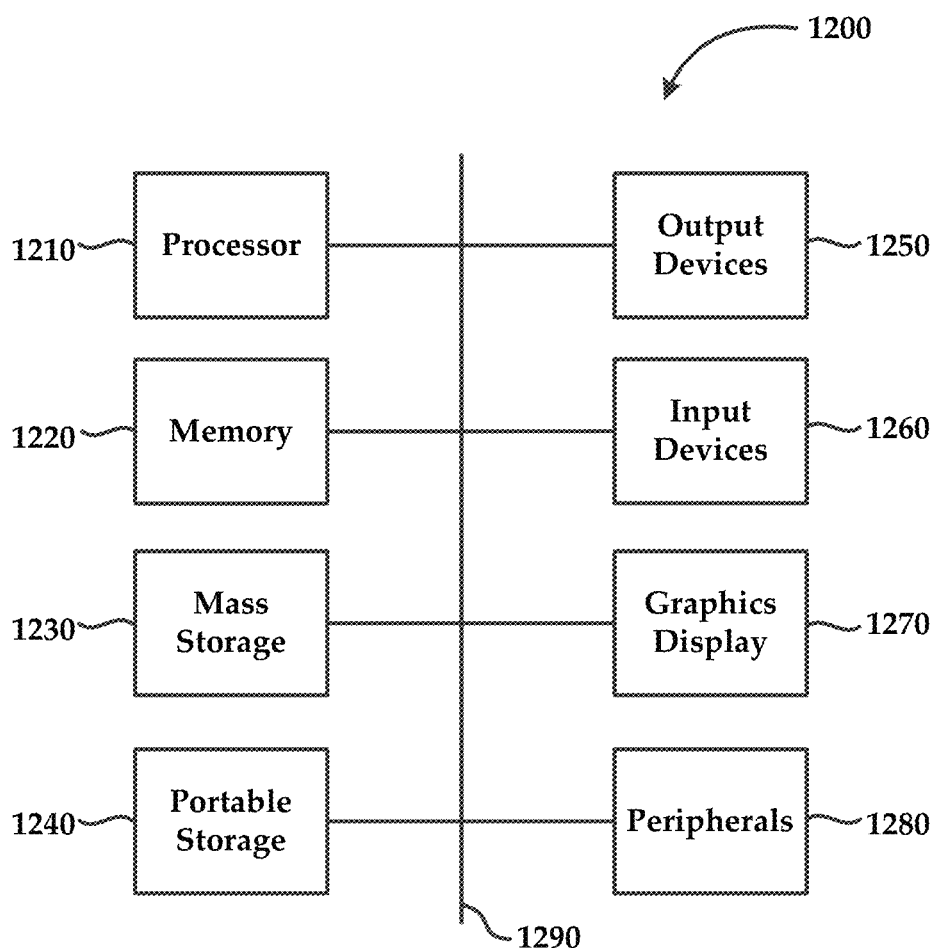
FIG. 12 is a block diagram of an exemplary computing system for implementing embodiments of the present technology.

FIG. 12 illustrates an exemplary computing system 1200 that may be used to implement an embodiment of the present technology. The system 1200 of FIG. 12 may be implemented in the contexts of the likes of computing systems, networks, servers, or combinations thereof. The computing system 1200 of FIG. 12 includes one or more processor (units) 1210 and (main) memory 1220. Main memory 1220 stores, in part, instructions and data for execution by processor 1210. Main memory 1220 may store the executable code when in operation. The system 1200 of FIG. 12 further includes a mass storage device 1230, portable storage medium drive(s) 1240, output devices 1250, (user) input devices 1260, a graphics display 1270, and peripheral device(s) 1280.

The components shown in FIG. 12 are depicted as being connected via a single bus 1290. The components may be connected through one or more data transport means. Processor unit 1210 and main memory 1220 may be connected via a local microprocessor bus, and the mass storage device 1230, peripheral device(s) 1280, portable storage medium drive(s) 1240, and graphics display 1270 may be connected via one or more input/output (I/O) buses.

Mass storage device 1230, which may be implemented with a magnetic disk drive or an optical disk drive, is a non-volatile storage device for storing data and instructions for use by processor unit 1210. Mass storage device 1230 may store the system software for implementing embodiments of the present invention for purposes of loading that software into main memory 1220.

Portable storage medium drive(s) 1240 operates in conjunction with a portable non-volatile storage medium, such as a floppy disk, compact disk, digital video disc, or USB storage device, to input and output data and code to and from the computer system 1200 of FIG. 12. The system software for implementing embodiments of the present invention may be stored on such a portable medium and input to the computer system 1200 via the portable storage medium drive(s) 1240.

Input devices 1260 provide a portion of a user interface. Input devices 1260 may include an alphanumeric keypad, such as a keyboard, for inputting alpha-numeric and other information, or a pointing device, such as a mouse, a trackball, stylus, or cursor direction keys. Additionally, the system 1200 as shown in FIG. 12 includes output devices 1250. Suitable output devices include speakers, printers, network interfaces, and monitors.

Graphics display 1270 may include a liquid crystal display (LCD) or other suitable display device. Graphics display 1270 receives textual and graphical information, and processes the information for output to the display device.

Peripheral device(s) 1280 may include any type of computer support device to add additional functionality to the computer system. Peripheral device(s) 1280 may include a modem or a router.

The components provided in the computer system 1200 of FIG. 12 are those typically found in computer systems that may be suitable for use with embodiments of the present invention and are intended to represent a broad category of such computer components that are well known in the art. Thus, the computer system 1200 of FIG. 12 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for processing messages using an intermediary node, the method comprising:
   receiving, at a cloud-based intermediary node, a message from a sender email server;
   analyzing, via the cloud-based intermediary node, before the message is delivered to a client email server, a link included in the message to determine if the link is associated with a potentially malicious resource, the message received from the sender email server;
   replacing the link with an alternate link to a trusted resource if the link is associated with the potentially malicious resource; and
   providing, via the cloud-based intermediary node, the message comprising the alternate link to the client email server, the client email server for delivering the message comprising the alternate link to an email client associated with the client email server, the email client for providing an email recipient with access to the message.

2. The method according to claim 1, wherein the message is an email.

3. The method according to claim 2, further comprising receiving a request to retrieve the alternate link from the email client; and causing a redirection of the request to a landing page.

4. The method according to claim 2, further comprising receiving indication that the alternate link has been requested from the email client; and providing a landing page in response to the request.

5. The method according to claim 2, further comprising quarantining the message if the link is associated with a malicious or potentially malicious resource or the content of the email is malicious or potentially malicious.

6. The method according to claim 1, further comprising analyzing content of the message to determine if the content included in the message is potentially malicious.

7. The method according to claim 1, further comprising modifying the message to visibly show, to the email recipient, www. followed by the domain name associated with the link associated with the potentially malicious resource.

8. The method according to claim 1, further comprising storing the link in a blocklist if the link is determined to be associated with a malicious resource.

9. The method according to claim 1, wherein analyzing comprises calculating a reputation score for the link; and comparing the reputation score to a threshold value, wherein replacement of the link is based upon the comparison of the reputation score to the threshold value.

10. The method according to claim 1, wherein analyzing includes examining the message for any of a uniform resource locator, a uniform resource indicator, an Internet protocol address, a domain name, or combinations thereof.

11. An intermediary node for processing email, comprising:
    a memory for storing executable instructions; and a processor for executing the executable instructions, the executable instructions comprising:
- an analysis module that receives, at a cloud-based intermediary node, an email from a sender email server, and analyzes, via the cloud-based intermediary node, a link included in the email to determine, before the email is delivered to a client email server, if the link is associated with a potentially malicious resource, the email received from the sender email server;
- a modifier module that replaces the link with an alternate link to a trusted resource if the link is associated with the potentially malicious resource; and
- a communications module that provides the email comprising the alternate link to the client email server, the client email server for delivering the email comprising the alternate link to an email client associated with the client email server, the email client for providing an email recipient with access to the email.

12. The intermediary node according to claim 11, further comprising a quarantine module that quarantines the email if the analysis module determines that the link is associated with a malicious or potentially malicious resource or the content of the email is malicious or potentially malicious.

13. The intermediary node according to claim 11, wherein the analysis module analyzes content of the email to determine if the content included in the email is potentially malicious.

14. The intermediary node according to claim 11, wherein the communications module receives a request to retrieve the link from the email client; and causes a redirection of the request to a landing page.

15. The intermediary node according to claim 11, wherein the modifier module further modifies the email to visibly show, to the email recipient, www. followed by the domain name associated with the link associated with the potentially malicious resource.

16. The intermediary node according to claim 11, further comprising a blocklist module that stores the link in a blocklist if the link is determined to be associated with a malicious resource.

17. A method for processing emails using an intermediary node, the method comprising:
- locating, via the intermediary node, at least one uniform resource locator included in an email, the intermediary node being cloud-based;
- analyzing, via the intermediary node, the at least one uniform resource locator, before the email is delivered to a client email server, to determine if the at least one uniform resource locator is associated with a potentially malicious resource, the email received from a sender email server;
- replacing the at least one uniform resource locator with an alternate link to a trusted resource if the at least one uniform resource locator is associated with the potentially malicious resource; and
- providing, via the intermediary node, the email comprising the alternate link to the client email server, the client email server for delivering the email comprising the alternate link to an email client associated with the client email server, the email client for providing an email recipient with access to the email.

18. The method according to claim 17, wherein analyzing comprises any of:
- comparing the at least one uniform resource locator to a blocklist of uniform resource locators known to be associated with malicious resources;
- evaluating an age of the at least one uniform resource locator; or
- any combination thereof.

19. The method according to claim 18, wherein if the age of the at least one uniform resource locator is less than a threshold age, the method further comprises evaluating content of the at least one uniform resource locator to confirm that the at least one uniform resource locator is associated with the potentially malicious resource.

* * * * *